United States Patent [19]

Dutton et al.

[11] Patent Number: 4,724,307

[45] Date of Patent: Feb. 9, 1988

[54] MARKED CARD READER

[75] Inventors: Clifton C. Dutton, Providence, R.I.; William R. Patterson, Rehoboth, Mass.

[73] Assignee: GTECH Corporation, Providence, R.I.

[21] Appl. No.: 857,114

[22] Filed: Apr. 29, 1986

[51] Int. Cl.⁴ .............................................. G06K 7/10
[52] U.S. Cl. ................................................... 235/455
[58] Field of Search .................... 235/455; 382/22, 23, 382/26

[56] References Cited

U.S. PATENT DOCUMENTS

| | | |
|---|---|---|
| 3,852,573 | 12/1974 | Dolch . |
| 3,864,550 | 2/1975 | Cragan . |
| 4,200,861 | 4/1980 | Hobach et al. . |
| 4,226,116 | 8/1987 | Und et al. . |
| 4,230,265 | 10/1980 | Casaly ................................. 235/455 |
| 4,326,258 | 4/1982 | de la Guardia . |
| 4,450,579 | 5/1984 | Nakashima et al. . |
| 4,489,351 | 12/1984 | d'Alayer de Costemore d'Arc . |
| 4,490,853 | 12/1984 | Nally et al. . |
| 4,493,108 | 1/1985 | Fryer et al. . |

Primary Examiner—Harold I. Pitts
Attorney, Agent, or Firm—Steele, Gould & Fried

[57] ABSTRACT

A reader for cards having handwritten marks positioned to encode data, is provided with an image recorder for capturing an instantaneous image of the possible mark-bearing area of the card, including the handwritten marks and identification marks printed on the card. A data processor digitizes the data to a matrix of pixels representing grey levels at spaced points in the image. Digital means are provided to locate the identification marks and define the expected mark areas of the image field while accounting for positioning error such as skew, and to map the image field into potential mark-bearing areas. A comparator then compares the grey levels at successive pixels or groups of pixels in the mark areas with immediate adjacent pixels or groups, thereby detecting marks by finding contrasting edges. The identification marks printed on the card can be variable in type or position to provide for separate game cards. The reader is adaptable to be reprogrammed for additional games and functions.

23 Claims, 8 Drawing Figures

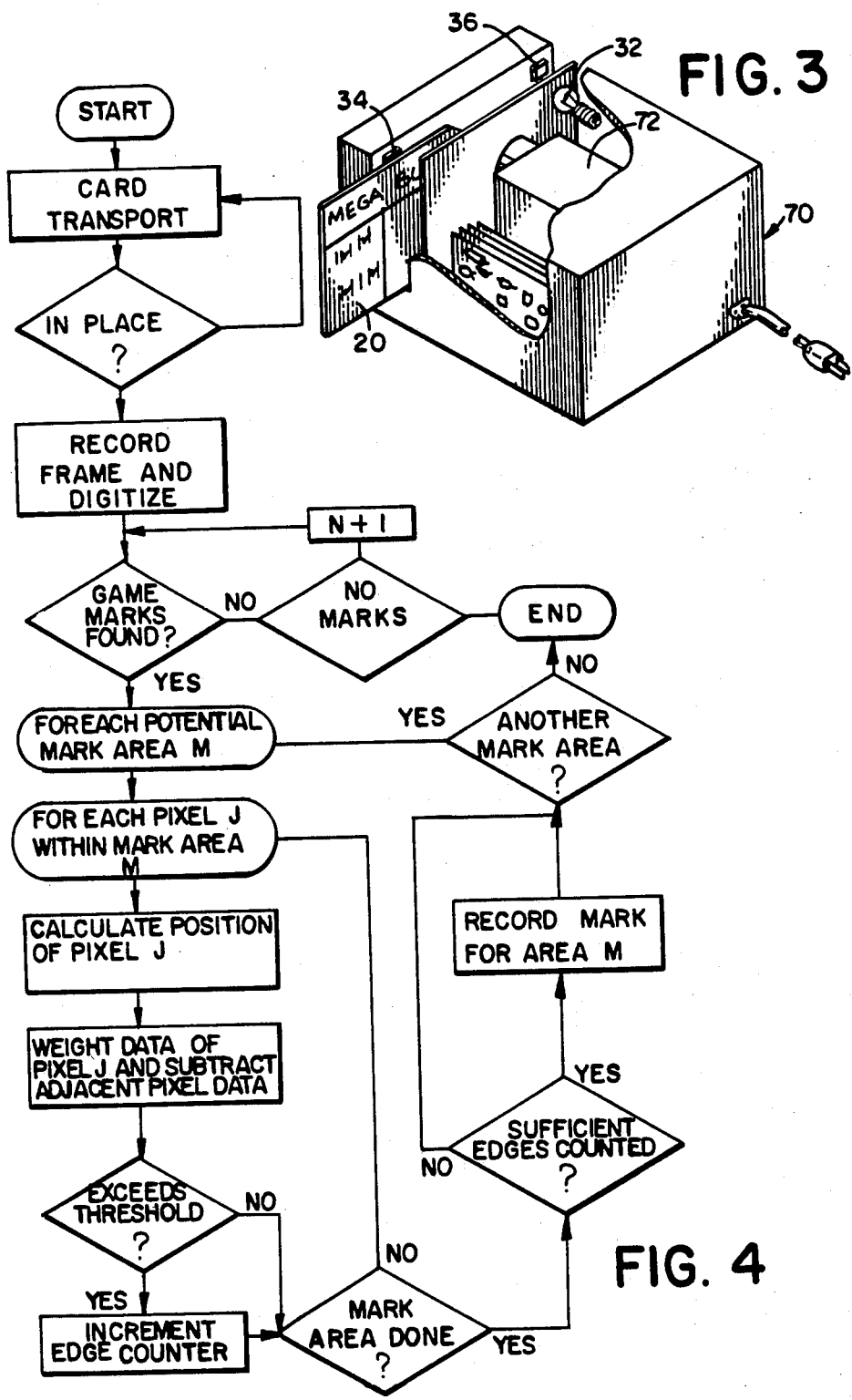

MARKED CARD READER

BACKGROUND OF THE INVENTION

1. Field of the Invention

This invention relates to the field of optical readers, and more particularly to devices adapted to discern the presence or absence of any of a variety of handwritten marks on printed forms bearing print-delineated areas for receiving the marks, such as lottery card entries, multiple choice cards, standardized test forms and the like.

2. Prior Art

Apparatus for analyzing video images of sheet material are known for certain uses. U.S. Pat. No. 4,493,108—Fryer et al teaches an apparatus for analytically dividing a printed or written document into relatively large image fields, whereupon markings in the particular fields can be more carefully analyzed for types of data expected to occur in such fields. Similar devices distinguish currency, marked envelopes, package markings, etc. The most frequent use of such devices is in connection with reading bank codes and amounts printed on checks. U.S. Pat. No. 4,326,258—de la Guardia analyzes a check by defining grey levels for sampled picture elements (pixels) in an image developed in data by moving the check transversely through a linear arry of periodically-sampled optical elements.

Image analysis devices based upon grey level data techniques usually convert the grey level data to a map of black or white pixels based upon some threshold stored for the device or calculated from the data. The black/white pixel pattern is then analyzed for spatial correlation with stored patterns. This is effective in connection with analysis of printed or written characters that correspond closely to expected forms. U.S. Pat. No. 4,490,853—Nally et al teaches a matrix character reading system in which a device developing a matrix of pixel data from a moving check or the like analyzes the patterns of grey levels to define dark and light pixels and to decode numeric characters printed on the check in distinctive magnetic or contrrasting ink shapes. The character fonts for these forms are especially adapted to optimally distinguish between numerals such that errors in decoding the printed numerals are less likely and the process is less sensitive to positioning and timing errors.

U.S. Pat. No. 4,450,579—Nakashima et al concerns a device in which a TV monitor camera is made controllably-rotatable around its viewing axis in order to enable correction of rotational misalignment of parts being viewed. The patent in particular teaches such a device for aligning the image with respect to semiconductor mounting pads that define a known spider shape.

Data is often manually coded on printed forms by users choosing and marking their choices of numerically marked boxes or the like. The boxes may be spaced on the forms or printed to indicate specific numbers or other data choices. The marks may be coarse slashes, lines, x-shapes, dots, rectangles, etc. In the reading of handwritten marks, for example on lottery card entries or standardized tests, it is possible to scan the image of a card or test paper, and to interpret the timing and position of dark marks on the card or sheet as data. This is normally accomplished by moving the card or sheet at a known rate transversely to a linear array of optical sensors. By correlating the timing or linear advance of the card or sheet with the lightness or darkness detected by each individual sensor, data is encoded to reflect spatial positions of pencil marks or the like on the card. This problem has some similarity to reading punched cards, but is complicated because the marks are not as standardized as machine made punch holes in either shape or position.

The designer of a mark reading device is subject to a dilemma. If the reader must be particularly fast or if a card is to encode a substantial quantity of data, it is necessary to position the potential mark choice boxes or the like close together, and to make them rather small. Alternatively, it may be necessary to move the card quickly through the array of sensors. Such efforts to improve processing speed or data density make analysis of the image even more demanding. Furthermore, improvements in the speed and accuracy of detecting data are expensive. These may relate to closer dimensional control of the cards, more powerful light sources to develop better images, more sensitive optical elements and greater precision in card feeding. Each of these changes can be expensive and most demanding in terms of precision, maintenance and the like.

Expensive high performance feeding or reading equipment might be justified in connection with certain applications such as standardized tests, in which a large part of all the marked test forms are to be centrally processed by one or a few processing offices. High performance equipment might also be appropriate for reading currency. On the other hand, it may not be cost justified to provide all point of sale terminals and all terminals for processing lottery card entries and similar hand-marked data cards with such sophistication. These cards and their readers should be dependable but simple and inexpensive. Their readers should be insensitive to variations in the cards and the manner in which marks are placed on the cards, and detection equipment should be accurate and inexpensive. With these objects in mind, it is difficult to justify the analytical sophistication and high precision hardware that might be used for devices that read shaped account numbers from checks, or otherwise perform relatively slow but important and precise analyses.

Lottery card systems have certain objects that do not compare with the objects of systems for encoding data from printed checks or other simple data entry operations. For example, a great deal of the player satisfaction and interest in a lottery game is related to the specific type of game. Games preferably have features that increase excitement of play, such as similarities to real-life chance events. Frequently, games of chance will be directed to sports, having some indicia suggesting baseball, football, horse racing or the like. Lottery cards especially adapted to such games of chance are appealing to consumers. Furthermore, different consumers may have different tastes in the type of game or the related sport or other terms on which they prefer to play.

Inexpensive marked card readers may also be subject to other uses such as fast-service retail establishments where customers make selections by marking cards. In this case, product attributes (e.g., the appearance of appetizing food, etc.) can be printed on the cards to be marked with selections.

A number of conventional features are used in the art to facilitate character location and character recognition by machine. These devices are based upon expecting distinguishable characters (e.g., having a known size and shape) to appear (or not appear) in the image at a predetermined location relative to other features or relative to the borders of the image. It is known, for example, to use spaced identification marks at the borders of the card for triggering imting signals. In such a device for example, detection of a timing mark causes loading of the current light/dark status of each photosensor in a row into a register. Timing marks are not used in the art as a means to discern among a plurality of possible lottery card entries, or to form a basis for mapping of an instantaneously-recorded matrix of data in an image field, to correct for variations in position due to x-y displacement and skew. Such displacement and skew are the frequent result of feeding of cards without a great deal of precision, or feeding cards that do not conform precisely to nominal dimensions due to folding or spindling, or imprecise manufacture, which attributes are only to be expected of lottery player entry cards.

According to the invention, the image of a player entry card with locating marks is recorded instantaneously. A stationary image is developed by stopping the card or strobing a light source illuminating a slowly moving card. Problems with misalignment and skew are minimized because the card image data can be analyzed by its locating marks. Therefore, problems that would otherwise be associated with misalignment of a card transversely fed through a linear array of photosensors do not occur. The video or other image is sampled and encoded for its grey levels at spaced pixels in a matrix covering at least the potential mark area of the card and an area of printed identification marks on the card. The identification marks, which are spaced, define a baseline against which the potential mark areas can be mapped.

Grey level pixel data is analyzed using a comparison especially adapted for use with handwritten marks, said marks being variable in shape and in darkness. The unit compares the darkness of pixels at successive pixels in potential mark areas with the immediately adjacent pixels in a pattern of a star. The pixel in the central part of this comparison zone, or the "target" pixel, is weighted by a factor equal to the number of adjacent points with which the target pixel will be compared. For example, the target pixel value is multiplied by 4, and the summed value of 4 adjacent pixels is subtracted therefrom. The resulting difference exceeds a threshold if there is an edge of contrast anywhere in the star-shaped pattern analyzed. This analysis is preferably done on a number of target pixels within the box, bracket or other printed delineation of a mark-receiving area. A sufficient number of such edges is taken to indicate the presence of a mark.

Inasmuch as the invention detects edges of contrast in the field of analysis, the lightness or darkness of the overall card and the lightness or darkness in the general field of analysis are both irrelevant. Detectable edges are therefore found even in marks on smudged areas characteristic of pencil erasures.

The invention is inexpensive enough for practical use in point of sale devices. It is also quite accurate and is particularly effective with handwritten mark sensing of lottery cards.

SUMMARY OF THE INVENTION

It is an object of the invention to provide an inexpensive but accurate and dependable reader for detecting presence of various handwritten marks in delineated areas on hand-marked data entry materials.

It is also an object to avoid encoding errors caused by misalignment or erratic feeding of customer data entry forms.

It is a further object to accurately detect any coarse or fine handwritten marks in possible mark-bearing positions in an image, without errors due to localized smudges or other marks due to dirt or erasures.

It is an object of the invention to provide an inexpensive mark reader having a few or no moving parts and requiring little to no maintenance for its entire useful life.

It is another object to relax tolerance requirements for manufacture of cards to be marked.

It is yet another object to provide a mark reader that is useful and optionally reprogrammable for marked recording ranging from lottery play selections and fast food selections to standardized test forms.

These and other objects are met by a reader for cards having handwritten marks positioned to encode data, provided with an image recorder for capturing an instantaneous image of the possible mark-bearing area of the card, including the handwritten marks and identification marks printed on the card. A data processor digitizes the data to a matrix of pixels representing grey levels at spaced points in the image. Digital means are provided to locate the identification marks and define the expected mark areas of the image field to account for positioning error such as skew, and to map the image field into potential mark-bearing areas. A comparator then compares the grey adjacent pixels or groups, thereby detecting marks byf inding contrasting edges. The identification marks printed on the card can be variable in type or position to provide for separate game cards. The reader is adaptable to be reprogrammed for additional games and functions.

BRIEF DESCRIPTION OF THE DRAWINGS

There are shown in the drawings the embodiments that are presently preferred. The particular features of the invention are illuminated in selected groupings and the invention is capable of embodiment in other groupings within the definition of the invention as claimed. The drawings are illustrative rather than liming, and in the drawings:

FIG. 3 is a partially cutaway perspective view of a physical embodiment of the invention.

FIG. 4 is a flow chart illustrating the procedural steps in image analysis according to the invention.

DETAILED DESCRIPTION OF THE PREFERRED EMBODIMENTS

In a typical lottery card or standardized test form, groupings of boxes, bracketed areas, ovals or otherwise-delineated spots printed on the form are provided for the user to selectively darken using a pencil or the like as a means to encode data. Although it may be possible to very accurately position the boxes, brackets, ovals and the like with respect to the edges of the ticket or form for accurate mark decoding using arrays of photocells aligned to the boxes, the wide variety of different types of marks made by typical users complicate the problem of mark sensing. A user's lottery entry form, for example, may be only a small card, yet may have spaces for a number of separate plays with each play requiring selection of several numbers out of a larger number of possible numbers. Individual games vary, but each play of six or more possible plays might require, for example, selecting and marking six numbers from one to forty. Selection is accomplished by placing a pencil mark inside labelled boxes or brackets. The users are instructed to use a specific predetermined mark, for example a vertical line passing completely through a selected box. Users nevertheless often place other marks on the card or completely darken the bracketed area. In an optimum system users may employ any of a variety of marks. Small dots, large dots, diagonal slashes, "X" marks and vertical slashes are all commonly marked regardless of instructions, to make number choices.

Handwritten marks of almost any description are easily discerned by humans, but the problem of machine-recognition of marks is somewhat more demanding. In typical automatic readers, the lottery card or the like is fed along a track transversely of a row or photosensors spaced to correspond with the number of boxes. Any misalignment of the card by displacement or rotation will present possible errors in detecting and encoding at least some of the marks on the card. Foreign material on the card or slide, skew produced by nonsymmetrical force from the driving wheels and the like will all tend to vary the X-Y position at which the number boxes pass a fixed reading mechanism. In the case of skew, the number boxes for a given row will appear at progressively higher or lower elevations for different areas of the card as the card is fed. According to the present invention the card image is held stationary. The entire information-carrying area of a lottery card, standardized test form, order form, or the like, is recorded instantaneously, and marks thereon are analyzed based upon position with respect to identification marks in the card image instead of expected position within the recorded frame. In this manner misalignment is cancelled and in every case the reader accurately defines the locations of potential mark areas. The invention is therefore not sensitive to accurate feeding or misalignment of the lottery card or form.

Figure 1:
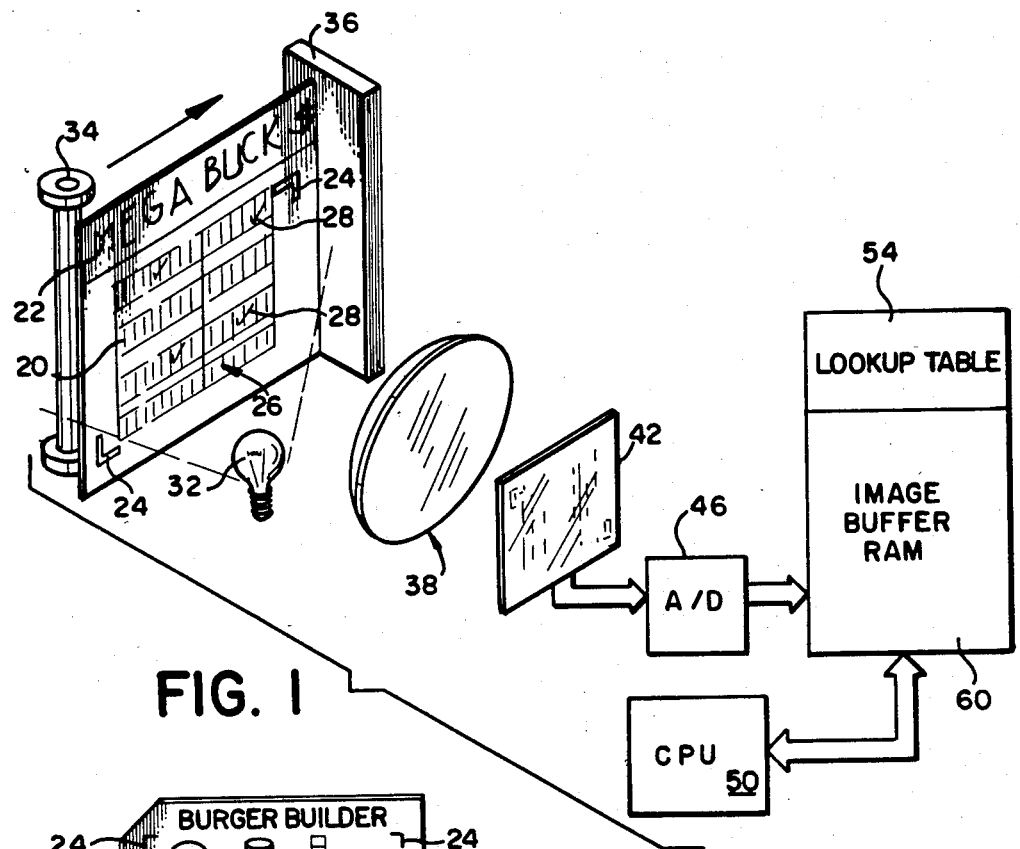
FIG. 1 is a schematic perspective view showing data flow according to the invention.

FIG. 1 shows a schematic illustration of the parts of the invention. A lottery card 20 is fed, for example by means of edge-mounted drive rollers 34, into an inspection area. This feed operation may also be done manually. The drive rollers may be stopped when the card is in position, or an abutment member 36 may be provided to stop the card in place. An illumination means 32 is directed at the card, and optical system 38, preferably including a filter to avoid sensing colored printing on the card, may be used to focus the image of the card, or at least the data-bearing area thereof, on photosensitive array 42. The information-carrying portion of the card is deemed to include the area carrying identification marks 24, and handwritten marks 28 within potential mark areas 26. The optical system 38 can be made adjustable toward and away from the card and sensor, for precise focusing or for enlargement or reduction of the image as needed when setting up the reader.

The level of illumination at spaced areas in the image as detected by individual elements in photosensitive array 42 is recorded as an analog voltage level accumulated for each picture element or "pixel" during a period of exposure. Individual pixels are addressed sequentially, and their associated analog voltage is encoded digitally using an analog to digital (A/D) converter. The digital data is stored to define a data matrix in an image buffer memory 60. Based upon the type of card being read and its location in the image, as detected for example by the position, shape or color of indentification marks 24, a section 56 of look up table 54 is selected and used to determine the addresses in the data matrix of the individual numbered boxes or brackets within potential mark areas 26. Analysis of the image data stored in image buffer ram 60, and possibly the control needed to collect the data, are accomplished by central processor (CPU) 50 and/or by an array of connected logic elements. CPU 50 executes a program preferably stored in read-only memory 52, for defining and analyzing potential mark locations in the image data based upon detected game-identification marks 24.

Initially, the identification markers 24 are located and their pixel addresses in the data matrix are used to define a baseline for the card in the image field. CPU 50 then uses the baseline and also the expected mark addresses from the lookup tables to analyze the image buffer data. Expected mark addresses are combined with baseline data to effectively cancel any relative misalignment of the card and the expected mark addressing data, due to physical displacement and or rotation of card 20 which may have occurred or due to manufacturing tolerance in either the card or the reader. This could involve reorganizing data in the image buffer, but preferably, baseline data and expected addresses of potential mark areas are used, when addressing the data in the image field, to account for the sensed alignment of the card in such a way that no reorganization is necessary.

There are a number of possibilities for the card feed mechanism, which, according to the invention need not be particularly precise. FIG. 1 illustrates one example with the drive rollers 34 and stop 36. The stop 36 may be stationary or movable into the feed path. It is also possible to omit stop 36 and simply stop driving of rollers 34 when a card is at least roughly in the imaging zone. Rollers 34 may be disabled, for example by removing drive power or using a clutch mechanism, upon detection of an edge of card 20 passing a predetermined point. Rollers 34 can be controlled to feed in a card, stop for reading, and then reverse to feed the card back to the user. The presence or absence of a card 20 to be read may be detected by a light source and photocell pair directed across the card area, possibly using a reflector.

It may also be possible to capture an instantaneous or "frozen frame" image of card 20 using other means, such as a rotating mirror or such tracking optical system, or short-duration illumination means, such as a one shot shutter or a short duration strobe flash together with a very slow moving or stationary ticket 20. Depending on the spacing of the potential mark area boxes and the speed of the card, such means may provide a frozen frame image without unacceptable smearing. Preferably, any smearing in the image due to card motion should be avoided to thereby enhance the effectiveness of edge-detection means and methods discussed hereinafter. The least expensive and most dependable way to record the image is to expose a stationary card.

A typical customer order card or lottery card includes visible indicia 22 in addition to the mark areas. The indicia may be the title of the game, instructions for ordering, or visually-appealing drawings. The card reader is, of course, not concerned with reading printed drawings or letters. In order to maximize the detected contrast between the handwritten marks and the background on the card, it is frequently advisable to print the potential mark area boxes on the card using colored ink, and to screen out that color by suitable filters in optical element 38. Element 38 may include one or more suitably-placed lenses for enlargement, reduction and/or focusing, and a colored filter. The purpose of the colored filter is to allow the system to distinguish between preprinted mark area boundaries and user written marks. For example, mark boundaries printed in certain types of red ink reflect very nearly the same fraction of incident red light as the surrounding paper. Therefore, a filter which transmits only red light interposed in front of a sensor array which is only sensitive to liminance will eliminate the contrast between the boundaries and the background tending to make the handwritten marks stand out. In general, a filter the same color as the printed boxes is effective for this purpose.

If it is necessary to distinguish against more than one color of printing, it would be possible to change the filter between acquiring successive images of the card. Also in place of or in addition to the filter, the array may be made sensitive to color by the incorporation of filter elements in it, but this is felt to be uneconomic and excessively constraining.

Figure 2:
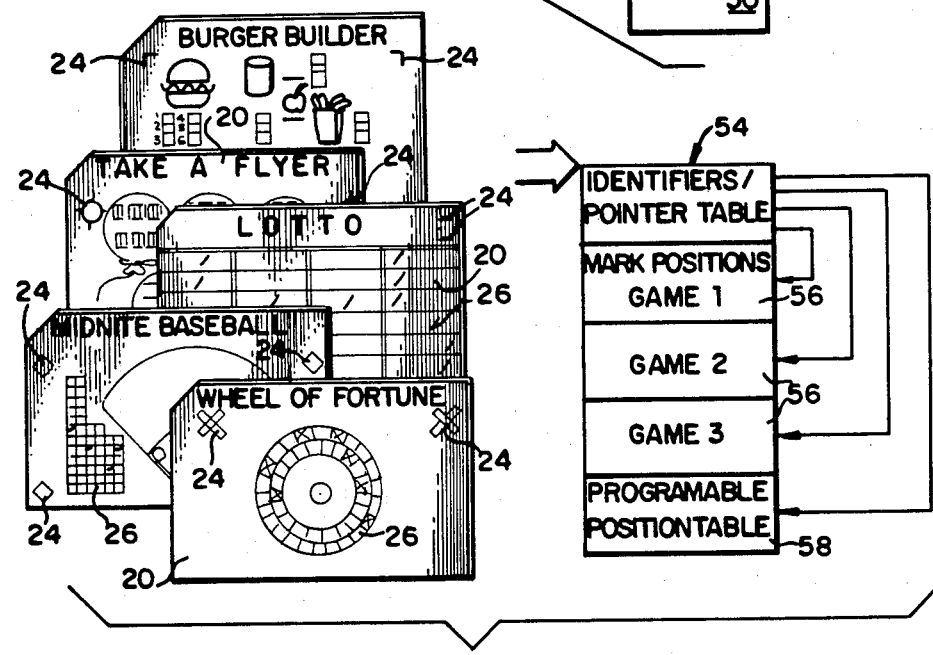
FIG. 2 is a schematic illustration of example distinguishable card layouts.

Identification marks 24 can be made shaped or positioned to be distinctive of a certain type of game card, test paper or the like to be read by the reader. A number of different cards are shown in FIG. 2, each card 20 having different positioning marks 24. Different marks can be placed at corresponding locations from card to card, placed in different locations to discriminate among cards, varied in shape, size or color, and otherwise varied in a distinctive fashion to allow different types of cards 20 to be treated differently.

Customers deciding to make purchases, and players of lottery games are sensitive to card indicia. Accordingly, order forms should present available products in a pleasing way. Operators of lottery games are also quite concerned with the particular type and marking of the card, even though the ultimate decision of winners and losers is based upon random numbers, rather than upon any factors affected by the game indicia on the card. Users prefer games which have some association with familiar games or procedures. Sports fields, gambling apparatus and the like are possible indicia to be included on the cards, and the outline and/or positioning of potential mark areas 26 can conform to the game type. Prior lottery cards or order cards have regular rows and columns, required as a result of the use of spaced photocells across which the cards were passed for reading. According to the invention, however, in addition to the row-and-column tabular positioning of potential mark areas for a lottery game or order card, virtually any mark box layout can be used. A game of chance related to baseball can have a diamond-shaped layout. A game directed toward spinning a wheel of fortune can have a round format. Order cards for products such as fast foods can be laid out to show the foods, etc. Furthermore, new order cards, games and layouts can be adopted without any remounting of photocells or other complex design changes.

The light-sensitive array 42 is shown generally in FIG. 1. This array can be part of a video camera system operative to produce a scanned raster view of the card, or alternatively, other image-recording devices can be used. Preferably, and with minimum expense, the light sensitive element is mounted on a circuit card and a lens mount between the circuit card and the marked card focuses the image on the light sensitive detector element. Charge coupled devices, charge injection devices, similar self-scanned arrays, or closely-spaced arrays of optical fibers leading to photodiodes could be used. Individual discrete elements can be used in an array or mounted on a single substrate. It is necessary, of course, to include control and readout means with appropriate control and timing circuits to sequentially address the individual photosensitive elements, and to convert their levels to digital format. It is also possible to use a packaged video camera system producing a raster scanning signal. In that case it is necessary to sample the analog video signal at regularly-spaced intervals, and to convert the sampled value to a digital number indicating the light intensity at that spot, defining a pixel. Of course, either of these procedures results in a digital record of the image, made up of discrete pixel numeric data.

The particular grey level can be recorded to a resolution as required for the application. Similarly, a video frame sensor element can be used having the necessary number of individual pixel elements as required. It is presently preferred that the image be recorded to a grey level sensitivity of one part in 64. The pixels are preferably arranged in an array of 320×244, and about 64K bytes of image data are stored in the image buffer. These features are provided using a Hitachi MOS imaging device Model HE97211, or equivalent. Texas Instruments produces a change coupled device having a pixel array of 754×488; Toshiba produces a change couple device with an array of 488×326. A charge injection device is also available from General Electric.

The image-sensitive element 42 can be used with commercially packaged microcontrollers and frame grabbers, for example, Hitachi's model 8031. However, it is substantially more economic to build the systems by interconnecting microprocessor, memory and analog to digital converter integrated circuits with sufficient logic, circuits to control such matters as the initiation of frame grabbing, the addressing of the photosensitive elements, the organization and formatting of digital data words, and the like. These logic circuits may be separate gates, counters, etc. or may be gate arrays, standard cell custom integrated circuits or the like as is well known to those skilled in the art. According to the invention, however, the logic can preferably be accomplished in a reprogrammable manner using a reprogrammable logic cell array, for example, that available from XILINX, INC. of San Jose, Calif. The reprogramming can be accomplished either by downloading from ROM or by downloading from a central facility, providing extensive versatility in sensor driving, data addressing and general purpose control features.

Figure 5:
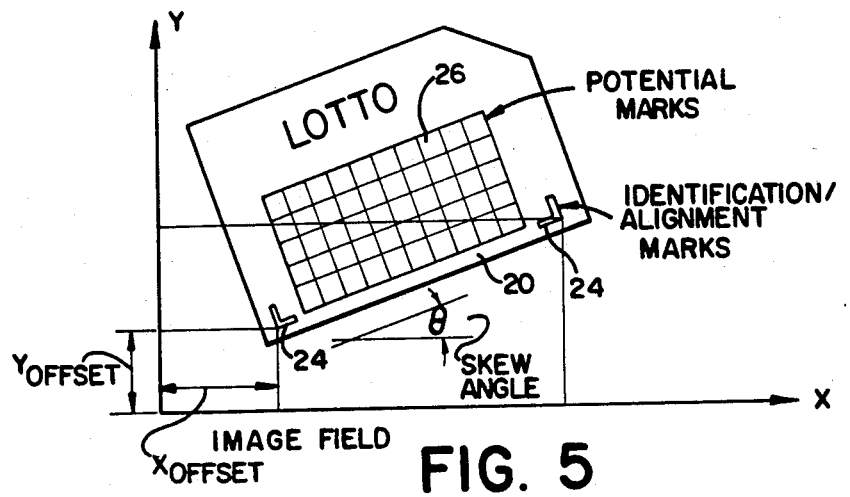
FIG. 5 is a graph showing the relationship of the recorded image field to the card image.

Once an image is captured in the image buffer memory, the CPU searches for identifier marks 24 in the image matrix. Preferably, the identification marks for the games are provided in one of a small number of general areas, whereby the CPU need only search the nominal area and the areas adjacent thereto. Referring to FIG. 5, for example, the image field can be scanned at the lower left and lower right across successively higher rows until marks 24 are found. The addresses in the image field at which mark 24 are found are indicative of the displacement of card 20 in X and Y axes, and also the rotational alignment of card 20.

The system is to be adapted to be insensitive to displacement or skew of the card. However, for practical purposes, the skew is unlikely to exceed about 5 degrees, even with coarse feeding equipment. This may correspond to a skew error or up to 20 pixels or so, across the card. The displacement is unlikely to exceed a centimeter. A suitable process for detecting the presence of an identification mark can include, for example, an initial search of an area of 1.5 cm diameter until a first identification mark is found in the image field. Having found one mark, the second mark can be found within a smaller search area because the address of the first mark narrows the possibilities. Preferably, identification marks are positioned or spaced distinctively, whereby the reader can distinguish between cards having different potential mark layouts, and accurately read whichever card is fed. It is also possible to use procedures that detect a shape of mark or pattern of lines in the image. Extensive analysis is time consuming and is not preferred. In any event, analysis of the image buffer ram by CPU 50 determines the placement and type of card by finding identification marks 24 on each card 20 which is fed into the machine.

Identification marks 24 are preferably well spaced from one another on card 20. The locations of the two marks in the image field then define a baseline in two dimensions in terms of an offset in X and Y directions of one mark from the position it would have on a perfectly positioned card and in terms of the angle of skew between the image data and the axes of the imaging system as shown in FIG. 5. The locations of potential mark areas (i.e., the boxes, brackets, and the like) in the image buffer memory are calculated by vector addition of the baseline data to the nominal locations of potential marks at zero displacement and zero skew as discussed below. The nominal locations of potential mark areas are stored in look up table 56. One address (x', y') can be stored for each potential mark for each type of game or card to be distinguished using identification marks 24.

The mathematical relationship between the x-y coordinates of the image buffer field (X,Y) and the coordinates of potential mark areas on the slip (X',Y') is calculated from the following matrix equation:

$$\begin{pmatrix} X \\ Y \end{pmatrix} = \begin{pmatrix} X_{offset} \\ Y_{offset} \end{pmatrix} + \begin{pmatrix} \cos(\text{skew angle}) & -\sin(\text{skew angle}) \\ \sin(\text{skew angle}) & \cos(\text{skew angle}) \end{pmatrix} \begin{pmatrix} X' \\ Y' \end{pmatrix} \quad (1)$$

The skew angle, shown as $\theta$ in FIG. 5, can be calculated as a function of the Y displacement between the identification marks. The identification marks can be printed on a line parallel to the edge of the card to simplify the calculation, if desired. Particular angles, and/or the sines and cosines of such angles, are preferably calculated, but could be found in a further lookup table based, for example on the pixel counts along the axes between identification marks. A very useful approximation is seen in the fact that the sine of an angle is approximately equal to the angle for small angles stated in radians, and the cosine for small angles can be approximated as one. This simplifies the above equation considerably. Such approximations are valid provided the skew does not vary over about five degrees.

To find the position of a pixel in a potential mark area, CPU 50 looks up its corresponding location (X', Y') in the portion 56 of lookup table 54 appropriate to the particular card and uses equation (1) with appropriate similifying approximations to calculate a two dimensional address (X, Y) in the image buffer memory 60. The CPU 50 then further combines X and Y by the same procedure by which the sensor and frame grabber logic store the image data to find the scalar digital address of the pixel in the image buffer memory 60. In the preferred embodiment, these two operations are done simultaneously in such a way as to require only two multiplications and three additions.

The procedure for finding the location of a potential mark may be summarized as follows: the potential mark area tables 56, may include, for example, nominal x and y addresses or displacements from an origin for the boxes. The addresses actually used to access the image buffer memory are numerically calculated from the nominal addresses and the baseline data by CPU 50 to account for the displacement and skew of card 20 in the image field of the reader. In effect, CPU 50 recalculates potential mark addresses using the nominal addressing found in lookup tables 56, in such a way as to account for the effect of any such skew or displacement. Final addressing is thus based on skew and displacement of alignment marks and on table 56.

A flow chart showing operation of data encoding according to the invention is seen in FIG. 4. A possible physical layout is shown in FIG. 3. The card transport mechanism is operated until the card is in position, as detected by photosensors or simply by allowing sufficient transport time to be sure that the card has reached the end of the track, for example at abutment 36. Drive rollers 34 may be used, or the system may be such that the user is required to manually slide the card along or drop the card into the inspection area. When the card is in place, a full frame is recorded at video speeds (i.e. with an exposure time about 1/15 of a sec.), and the data is digitized and stored for analysis. The acquisition of the frozen frame could be by strobe illumination using a flash lamp for lamp 32 or by video camera circuitry or by other means.

After a frame is stored in the image buffer memory 60, the CPU 50 commences examination of the image to locate and determine the address in the image field of two spaced identification marks 24 according to one of the types of marks stored. Presence or absence of plural marks can be sequentially tested or concurrently tested. In any event, once the identification marks are found, the skew angle and displacement are calculated and the image buffer data can be examined in the areas of potential handwritten marks. In so doing the potential-mark-lookup tables are operated on based on the measured displacement and skew, thereby generating actual pixel addresses for expected marks. The potential mark lookup tables contain the correct addresses when the displacement and skew are zero, i.e., when the card is perfectly positioned.

Figure 7:
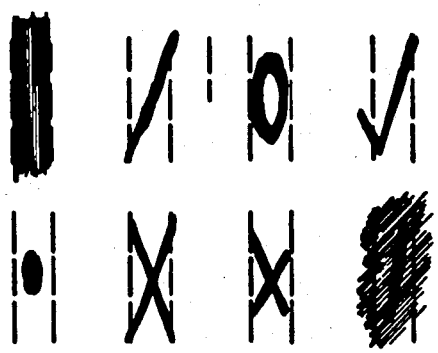
FIG. 7 is a representation of various marks.
Figure 8:
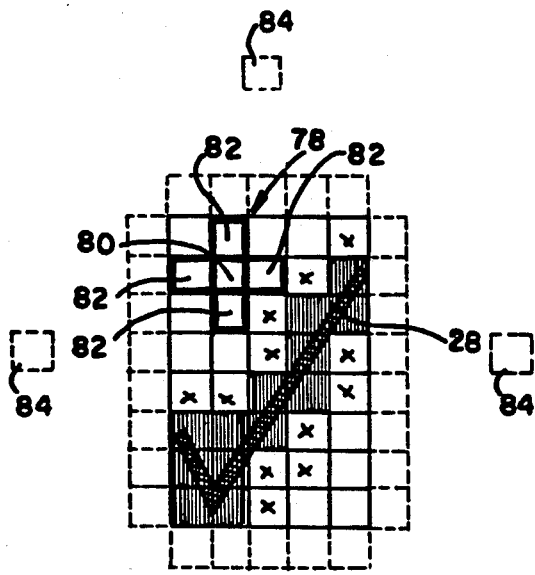
FIG. 8 is a schematic pixel analysis of a mark bearing area.

Analysis of the pixel brightness data with respect to a potential mark area as defined by its box, bracket, etc. is conducted by finding edges in the potential mark field. Such edge detection can be coarse or fine, depending upon the extent of storage and the processing time employed in image analysis. Edges are detected by comparing the grey level intensity of a target pixel with adjacent or nearly adjacent pixels in a roughly circularly symmetric pattern of surrounding pixels similar to a star shape. Some typical user marks are shown in FIG. 7, and one mark is examined as seen in FIG. 8. Analysis of contrast in a star pattern will tend to discriminate very dependably between marked and unmarked boxes by finding contrasting edges.

Each potential mark area comprises at least 20 pixels and preferably 40. These may be arranged as a box, oval, circle or the like. A 5×8 pixel block is shown in FIG. 8. Each pixel in the boxed or bracketed area, and those immediately adjacent, are compared. For each potential mark areas, the grey level intensity for each successive target piel in the areas (and preferably adjacent thereto) is weighted by a factor equal to the number of pixels appearing in the star pattern. In the illustrated case, the brightness at target pixel 80 is multiplied by 4. The brightness at the adjacent pixels 82, in a pattern of a star, is then subtracted, without weighting, from the weighted value for pixel 80. If the absolute value of the result falls above a predetermined threshold, an edge is found. Alternatively, if there is reason to expect large variations in local contrast across the card, this threshold may be calculated by CPU 50 for each potential mark area by examining a few background pixels near that area. For example, the threshold might be set to a predetermined fraction of the sum of the gray levels of a set of pixels outside of the mark area and surrounding it as pixels 84 in FIG. 8. If enough edges are found at the box, a handwritten mark is deemed to be present in the box.

One difficulty with sensing of handwritten marks relates to the fact that users will sometimes erase a mark. If analysis is based upon darkness within the box as compared to darkness outside the box generally, then a smudge as caused by an erasure will erroneously be interpreted as an intended mark. If localized smudging is determined not to be mark, then a user's marking of a smudged area can likewise be misinterpreted. The edge analysis according to the invention effectively reads through smudges, being sensitive to localized changes in contrast, and not to the general brightness of the card or the existence of a smudge over one box but not others. Regardless of the shape of the mark, and in a manner insensitive to the absolute brightness of the area, each pixel in the mark area is locally examined for an edge.

In FIG. 8, the potential mark box 78 is shown in solid lines. The area of examination includes the pixels shown in broken lines around box 78. The pixels are examined sequentially, and each target pixel 80 as shown in FIG. 8 is compared with the immediately surrounding pixels 82. If a check mark 28 is made in the box, and assuming that the check mark is at least roughly represented by the darkened pixels in FIG. 8, then analysis in the star pattern shown will find edges not only at the dark boxes representing check mark 28, but also at the surrounding boxes marked with the designation "x". With the check mark shown, approximately half the pixels in the box test positively for edges. The predetermined minimum of number of edges in a box which will be interpreted as a mark can be, for example, 25% of the number of pixels, or another threshold as required for a particular application.

Inasmuch as the X - Y addresses of potential mark areas are defined, the system need only analyze the pixels at and round the bracketed portion of the card. With respect to FIG. 8, the address of one of the pixels in the box, for example one of the corner pixels, may be defined using look up table 56 and the calculation based upon displacement and skew found in locating alignment marks 24. The proportion of the overall image that is required for analysis may be as little as 10%, because the system look for marks only where they are reasonably expected. Even though the card feeding mechanism may be coarse, mark detection is quite accurate and effective.

FIG. 8 shows analysis using a four-weight star technique in a "+" arrangement. It is also possible to weight target pixel 80 by eight, subtracting the value of each of the eight adjacent pixels, an edge being found if the absolute value of the result exceeds some minimum. That minimum may be either predetermined or determined locally for each mark area. The star pattern can be in an "X" shape rather than "+". Another technique is to skip pixels and thereby space the nonweighted "adjacent" pixels from the weighted target pixel, forming a larger star pattern. The only constraints on the position of the "adjacent" pixels is that they be fairly close to the center pixel and be distributed about that pixel in a roughly circularly symmetric pattern.

A less preferred variation on this technique is to subtract the sum of the grey levels of some set of pixels fixed for any particular mark area and being distributed around and just outside the mark area, as, for example, the marks 84 in FIG. 8, from the appropriately weighted grey level of target pixel 80. A sufficient absolute value of that difference is taken to indicate an element of a mark, and a minimum number of elements is taken to indicate presence of a mark.

Weighting and subtracting according to the invention is most conveniently accomplished using weights which are integer powers of two. The arithmetic functions (e.g., multiplying by a an integer power of two such as four or eight) are easily implemented. In the two examples, multiplying a binary pixel value by four amounts only to a left-arithmetic shift of two bits; and multiplying by eight is a shift of three bits. These arithmetic operations can be accomplished with minimum program steps, and with much less burden on CPU 50 than multiplication by a more arbitrary weighting.

Having compared the edge count in block 78 to a preset minimum and having found a mark present at a known position corresponding to a predetermined customer order form such as a lottery entry number, the system makres such use of the data as required for taking the order or playing the game. Frequently, customer verification forms are produced. The data can be downloaded to a central supply station or to a central lottery station or the like.

The preferred system is reprogrammable as to card format by modification of the lookup table 54. In the event that more than one type or combination or identifier marks 24 are used in the preferred device for distinguishing different games, it is also possible to use combinations and types of identifier marks for other purposes. For example, service representatives can be provided with cards having special or unique identification marks which enable functions that differ from those ordinarily required to play the game. Such cards can, for example, initiate test functions in which the machine exercises its usual functions but without causing an actual entry to be made by failing to download the data. This function may be useful for diagnosing equipment problems in the reader. Special identification marks can also be used for changes in programming, detection of some unusual mark or combination of marks being the signal for the CPU to change modes. Additional possiblities will now be apparent.

Figure 6:
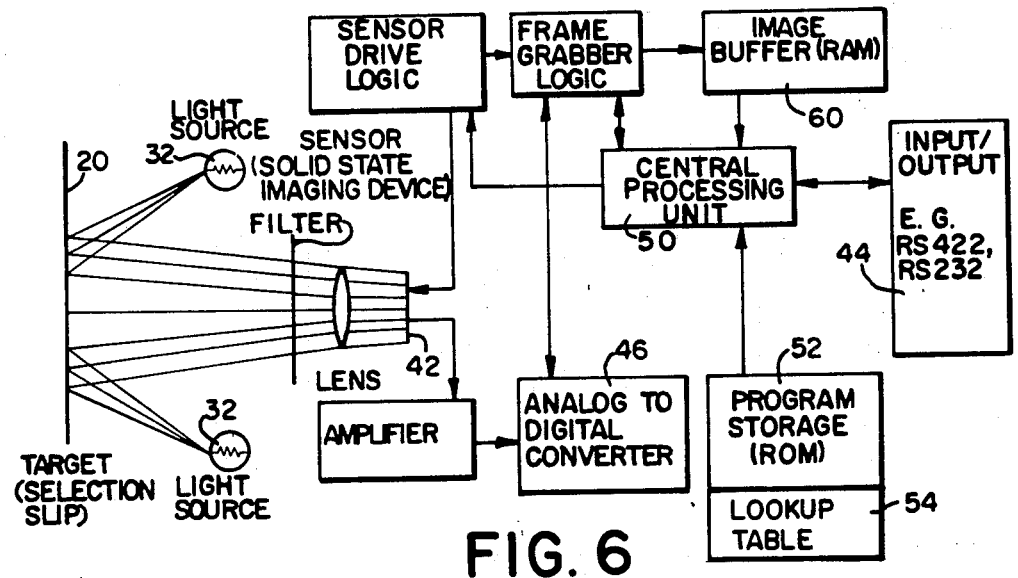
FIG. 6 is system block diagram showing the interconnection of elements.

A particular embodiment of the reader of the invention is shown in schematic diagram in FIG. 6. This embodiment is particularly adapted for a solid state imaging device as the photosensitive sensor. A light source is directed at the target card or sheet, and the color-filtered image thereof is focused on the solid state imaging device using a lens. The imaging device can be controlled by appropriate sensor drive logic that causes the image to be recorded when the ticket or sheet 20 is in position. the image is read out through an amplifier to an analog to digital converter, which together with a frame grabber loads the image buffer ram 60. Preferably all the pixels are encoded and stored. It is also possible to improve response time by decreasing resolution, for example by dropping every so many pixels. Preferably, the device stores all pixels but uses a preliminary analysis similar to that shown in Fig. 8 on every other pixel. This preliminary test results in a clear indication of mark present (e.g., 5 or more edges) or mark absent (e.g., zero edges) for many of the potential mark areas. For the potential mark areas that are not clearly resolved (e.g., 1–4 edges detected), the pixels which were skipped in that mark area are also tested.

CPU 50 may be programmed, monitored and/or used for other operations bymeans of an input output device such as a keyboard. The CPU program 52 and lookup table 54 may be stored in one plug-replaceable ROM, whereby the program is easily changed by changing ROMs, for example to account for new types of games or other functions. Alternatively these functions may be stored in an electrically reprogrammable read only memory (EEPROM) that can be reloaded as necessary from a central station through the input/output port 44.

The system of the invention is quite accurate and yet inexpensive. The device is deliberately tolerant of misalignment between optical system and the lottery card or other hand marked form, and avoids problems associated with attempts to develop an image of a sheet by means of transverse motion across a line of discrete sensors, for example using clocking marks or the like to develop a matrix. The system therefore avoids maintenance problems in that the card transporting apparatus can be unsophisticated, need not employ motors that cause inductive noise, and is only even necessary if throughput is such a problem that manually passing the slip through the reader will not suffice. The system is flexible by means of the fact that any or all areas in the overall image can be individually analyzed rather than only particular portions that may be associated with hardware device layout or timing values. The layout of the slip can therefore be varied with ease.

According to the presently preferred embodiment, the reader is packaged in a dustproof sealed housing 72, the slip being viewed through a clear or color tinted window therein. FIG. 6 illustrates a connection of elements and FIG. 3 illustrates a mechanical arrangement therefor. Unlike the embodiment shown in FIG. 3, it is also possible to fold the optical path and increase the effective focal distance by placing a mirror between the lens and the image sensing apparatus. The lens, which is designed to minimize the focal distance and maximize the usable area of the image, is dimensioned for the particular geometric requirements employed. In the event that paper shrinkage or variations in lens magnification are significant, a scalar factor, also determined from the position of marks 24, and can be applied during analysis to account for overall image size as well as displacement and skew.

The solid state image sensor currently preferred is a planar array of solid state sensing elements of at least 256 by 256 pixels. Suitable devices as noted herein are available from a variety of companies, such as MOS imaging devices, charge-coupled devices and charge injection devices. Other devices may also be operable. Each imaging technology together produces a matrix of light intensity values, for example, in an array of at least 256 by 256 pixels to be digitized with sufficient resolution for analysis. The image is broken down, preferably to 6-bit resolution, for storage in random access memory. A 64K by 8-bit memory is considered adequate. Preferably, portions of the random access memory are shared between the frame acquisition elements and the CPU. For example, the frame grabbing device can load data to the RAM as a direct memory access function outside of CPU control. Timing and general system control can be accomplished by the CPU, or preferably, by appropriate reprogrammable logic hardware that synchronizes the respective elements as needed.

The currently preferred system can accurately determine the presence or absence of varying types of marks, and will dependably complete the analysis of a typical lottery-type card within less than one second, and preferably within a third of a second. The player entry form, preferably a red-printed slip, has accurately-located boxes or brackets, but the system will operate well even at less precise box printing than necessary for readers using linear spaced photosensitive elements, normally accurate to about 5 thousandths of an inch. Typically, according to the preferred device, the edge detection technique discussed hereinabove will accurately determine a typical handwritten "X" mark or other corresponding mark to have 10 to 20 edges out of 40 pixels. Inasmuch as the edge detection technique relates to a localized contrast analysis rather than simply a threshold count (e.g., number of pixels of less than 50 percent brightness), there is no danger of improper readings due either to variations in the overall brightness of an image or to localized smudges. Accordingly, the system requires no particular adjustment after set up, even to change or add card formats. The system of the invention minimizes failure-prone moving parts, and provides a great range of versatility and sensitivity.

The system is also quite apt for use with various suites of choices including not only various lottery games but also other uses involving manual selections. Different suites can be distinguished by the formatting of the cards as disclosed herein. A particularly advantageous embodiment uses card formating to distinguish between suites of products such as fast food selections. The different suites can be fast food menus, such as the breakfast meanu, lunch menu, dessert menu, and so forth.

Additional embodiments are possible and will now occur to persons skilled in the art. Reference should be made to the appended claims rather than the foregoing specification as indicating the true scope of the invention.

What is claimed is:

1. A reader for encoding data represented by presence and position of hand-written marks on at least one card having printed areas for receiving them marks, the reader comprising:

an image recorder operative to capture a substantially instantaneous planar image of a surface of the card, the image including data representing grey levels for each pixel in an x-y matrix of pixels, and the image having at least two spaced identification marks, the identification marks being located at predetermined locations on the card and at indeterminate locations in the image;

a comparator operative to detect location of said identification marks in the image and means responsive to detected location of said marks for mapping the matrix of pixels in the image into potential mark areas; and a discriminator operative to compare the grey levels for pixels at said potential mark areas with the grey levels for pixels surrounding the potential mark areas, whereby marks present at said potential mark areas are sensed.

2. The reader of claim 1, wherein the image recorder includes a card feeder, an illumination means and a memory effectively storing a stationary data image of the surface of the card.

3. The reader of claim 2, wherein the card feeder includes a driven transporter for moving the card to a particular position for recording the image, and the image recorder includes an array of variable-output light sensitive elements.

4. The reader of claim 1, wherein the image recorder comprises an array of light sensitive elements operative for generating analog states representing brightness of spaced points in the image, control means connected to the array for sequentially selecting the analog levels for the spaced points, an analog to digital converter producing a digital representation of the analog levels, and a random access digital memory storing said digital representation.

5. The reader of claim 1, wherein the cards are lottery entries and further comprising means for distinguishing a plurality of card types by distinguishing identification marks, the identification marks being distinctive or particular lottery games of a variety of games offered.

6. The reader of claim 1, wherein the cards are customer order cards marked to indicate an attribute of potential orders of a customer.

7. A data encoding system, comprising:

a supply of sheets having predetermined areas for receiving handwritten marks, the sheets bearing distinctive identification marks at spaced locations, the identification marks being positioned in predetermined relation to the areas for receiving handwritten marks;

illumination means for the sheets and an image recorder operative to record in an image buffer a matrix of data points representing frozen-frame grey levels of pixels within a length and width on the sheets, the length and width including the identification marks;

a data processor operative with the image buffer to define potential mark areas on the sheets relative to the identification marks;

a discriminator having weighting and arithmetic elements operative to discern marks in the potential mark areas by weighting grey levels at a part of the potential mark areas and subtracting from the weighted grey level values of areas nearby said central part, the result indicating a mark present.

8. The system of claim 7, further comprising a feeding apparatus operative to transport successive sheets for recording to an inspection area.

9. The system of claim 7, further comprising means for manually feeding sheets to an inspection area.

10. The system of claim 8, wherein the feeding apparatus is intermittent whereby a frozen frame image is recorded by stopping said sheets in the inspection area.

11. A mark sensing card reader for discerning presence of handwritten marks on potential mark fields on a plurality of cards, the cards having indicia at spaced locations, the indicia being distinctive of a certain product, the reader comprising:

a planar image sensing device with drive and amplification means operative to capture analog data representing an image signal across an entire length and width of a field on successive ones of the cards fed into the reader;

an analog to digital converter operative to digitize the analog signal into a matrix of pixel data points having variable grey levels;

an image memory for storing said data points;

means operable to detect the presence of said indicia distinctive of the certain product and to determine a position thereof in the image memory;

a data processor operable to address data in the image memory to map said pixel data points relative to the indicia distinctive of the certain product and to define potential mark addresses within the matrix of pixel data points; and a contrast discriminator comparing the grey levels at pixels at said potential mark addresses with grey levels nearby said potential mark addresses, for discerning presence of said marks.

12. The card reader of claim 11, wherein the data processor processes the data in the image memory differently for different suites of indicia distinctive of a plurality of different suites of products, the different suites having differently-formatted cards.

13. The card reader of claim 12, wherein the different products are lottery games.

14. The card reader of claim 12, wherein the different suites of products are fast foods, and the suites correspond to menus.

15. The marked card reader of claim 11, wherein the contrast discriminator is operative to compare said grey levels at the potential mark address with grey levels at addresses at least roughtly symmetrical about and surrounding the potential mark address.

16. The marked card reader of claim 15, wherein the data processor is operable to detect a portion of a mark at each said potential mark address by adding grey level values from N locations nearby the potential mark addres, and subtracting the grey level value located at said address multiplied by N, such that a sufficiently large difference indicates a portion of a mark and a predetermined sufficient number of portions of a mark within the total potential mark area indicates the presence of a handwritten mark.

17. The marked card reader of claim 16, wherein a portion of a mark is considered present at a potential mark address when the absolute value of the subtracted grey level values exceeds one of a predetermined minimum and a calculated minimum, the calculated minimum being determined from the local brightness at the potential mark area and the brightness of an area immediately adjacent thereto.

18. The marked card reader of claim 11, wherein the analog video signal is generated by one of several possible types of two dimensional solid state sensor array including a charge-coupled element array, photodiode array, MOS imaging device array, charge injection device, and photocell array.

19. The marked card reader of claim 11, further comprising a memory element operative to store definitions of said potential mark addresses relative to the indicia distinctive of a certain product, the data processor co-operating with the memory element.

20. The marked card reader of claim 19, wherein a portion of the memory element is nonvolatile memory having tables for the definitions for a plurality of different games.

21. The marked card reader of claim 19, wherein the memory element is at least temporarily programmable, and further comprising means for altering the definitions contained therein.

22. A method for reading a lottery game card having handwritten marks positioned thereon to indicate data, the method comprising the steps of:
  recording an instantaneous image of the card, the card having at least two spaced identification marks printed thereon;
  defining a plurality of potential mark areas with respect to the identification marks;
  comparing contrast between a central part of the potential mark areas and parts adjacent to the central part, thereby discriminating presence and absence of marks; and,
  storing the data.

23. The method of claim 22, further comprising detecting one of a plurality of edges in the image distinctive of different game cards, said defining of potential mark areas being different for different game cards.

* * * * *

UNITED STATES PATENT AND TRADEMARK OFFICE
CERTIFICATE OF CORRECTION

PATENT NO. : 4,724,307
DATED : February 9, 1988
INVENTOR(S) : Dutton et al

It is certified that error appears in the above-identified patent and that said Letters Patent is hereby corrected as shown below:

Column 3, line 5, "imting" should be --timing--.

Column 4, line 16, "recording" should be --records--.

Column 4, line 30, after grey, insert --levels at successive pixels or groups of pixels in the mark areas with--.

Column 4, line 40, "illuminated" should be --illustrated--.

Column 4, line 43, "liming" should be --limiting--.

Column 8, line 20, "camers" should be --camera--.

Column 8, line 38, "change" should be --charge--.

Column 8, line 39 "change" should be --charge--.

Column 11, line 17 "piel" should be --pixel--.

Column 15, line 1 "them" should be --the--.

Signed and Sealed this

Twenty-eighth Day of June, 1988

*Attest:*

DONALD J. QUIGG

*Attesting Officer*  *Commissioner of Patents and Trademarks*